Feb. 3, 1942.  J. F. KERKAM  2,272,010
HARNESS BRACKET FOR FISHING RODS
Filed July 12, 1941
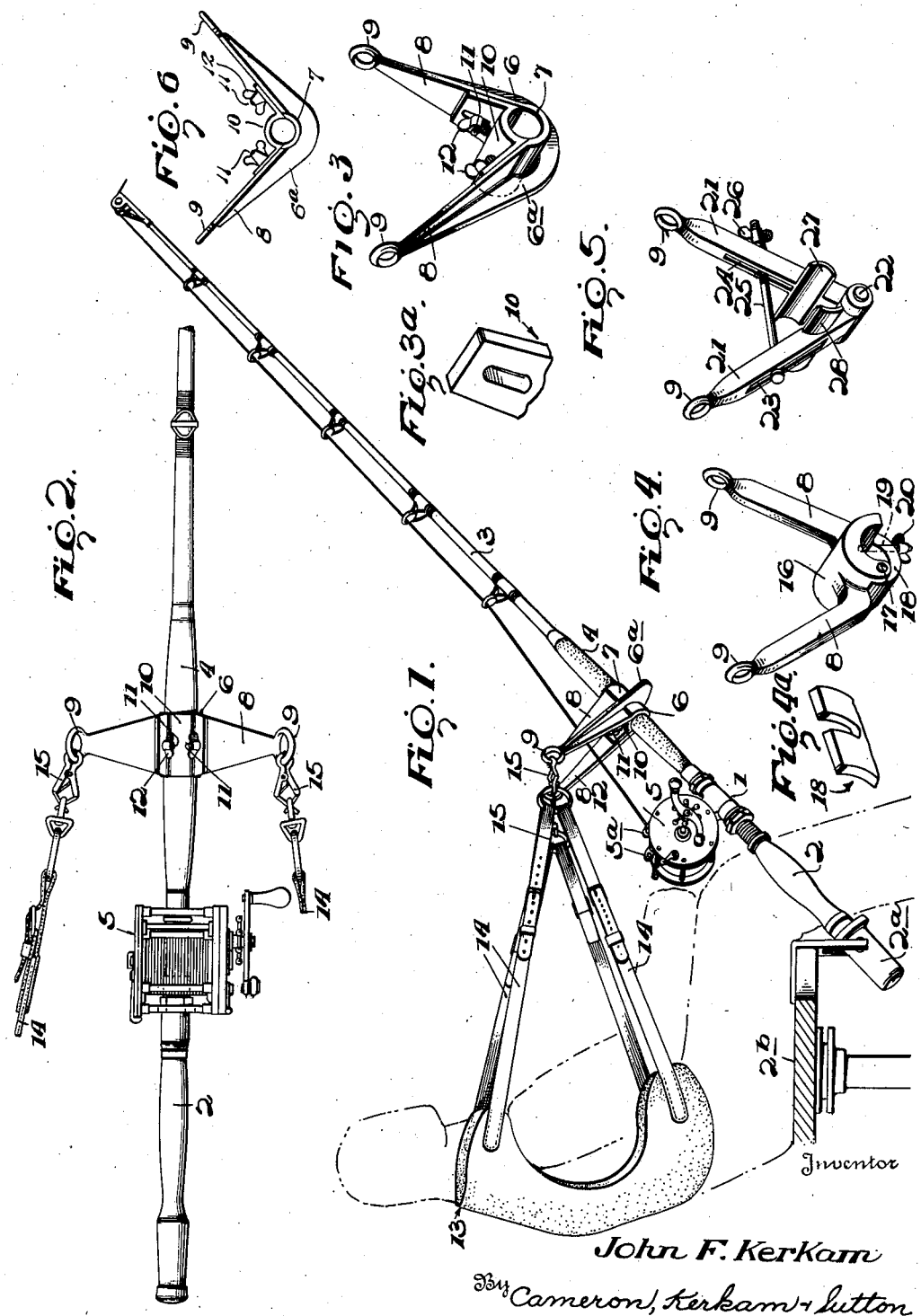
Inventor
John F. Kerkam
By Cameron, Kerkam & Sutton
Attorneys Patented Feb. 3, 1942

2,272,010

UNITED STATES PATENT OFFICE 2,272,010

HARNESS BRACKET FOR FISHING RODS

John Freeman Kerkam, Washington, D. C.

Application July 12, 1941, Serial No. 402,250

8 Claims. (Cl. 43—25)

This invention pertains to an improved harness bracket for attachment to fishing rods, particularly heavy fishing rods, and to which the hooks or snaps of the angler's harness may be attached.

It is usual in so-called "big game fishing" for the angler to wear a harness of leather or other material about his shoulders or back hooked by straps or traces to harness rings on the tops of the side plates of the reel to assist him in "pumping" and working heavy fish. This harness further assists the angler in holding a heavy reel upright and enables him to throw his weight against the rod while fighting the fish.

The practice of placing the harness attaching rings at the tops of the respective side plates of the reel has a number of serious disadvantages. Primarily, it throws all of the strain on the side plates and seat bar of the reel and tends to force the side plates of the reel out of alignment. When a fish makes a sudden run to the side or sounds deep to the side a heavy strain is thrown against one or the other of the side plates of the reel. This frequently causes disalignment of that side plate and results in "freezing" or jamming of the reel spool. Irreparable damage to the reel and, in most cases, loss of the fish result.

Large fishing reels of sizes 9/0 to 16/0 have been brought to a high state of perfection. Most of them are ball bearing throughout and made of the very finest materials. If they are not abused they will last indefinitely. However, due to the practice of attaching the harness traces at the tops of the side plates of the reel the aforementioned disalignment of the plates with attendant damage to the reel frequently occurs.

Another disadvantage in the attachment of the harness to the top of the reel itself lies in the fact that a great deal of the angler's effort is wasted due to insufficient leverage on the rod. Large reels for the heaviest type of game angling (9/0 to 16/0) are from 5" to 8½" in diameter. The reel is mounted on a reel seat on the butt of the rod and thus extends to a distance equal to its diameter above the axis of the rod. The butts of most heavy fishing rods are from 14" to 18" in length and are supported in a swivel socket mounted in the front center of the fishing chair several inches below seat level. As a result of the height of the reel and the length of the butt the traces running from the shoulder harness to the reel are relatively short, on the order of from 12" to 16" in length for the average angler. Due to the shortness of the traces and the point at which they are attached to the rod and reel combination the angler loses a great deal of potential mechanical advantage and leverage.

In heavy fishing for giant tuna, marlin, swordfish and mako shark, a terrific strain is imposed on the angler. From the strike until the fish is boated the angler must exert himself to the fullest extent. The strain is so intense that serious injury, and sometimes death, have resulted. Applicant's device is designed to eliminate much of the strain on the angler by increasing the mechanical advantage between the angler and the rod. With applicant's device much less effort exerted results in greatly increased foot pounds of energy applied to the rod. The device therefore makes heavy fishing feasible for persons of inferior strength and stature.

Applicant's invention consists in a bracket designed to be mounted about the tip of the rod above the reel, to receive the hooks of the harness traces, which will obviate the defects attendant on the conventional method of harness attachment. It eliminates most of the causes of damage to the reel and further enables the angler to apply greater force to the rod without excessive exertion or strain. The device consists preferably in a substantially V or U-shaped bracket which is placed under or about the forward grip on the tip of the rod preferably at least 6" in front of the reel and which extends outwardly and upwardly from the rod. The bracket is preferably affixed to the grip by suitable clamping means which prevent relative movement between it and the rod. To the upper extremities of the bracket are preferably affixed suitable rings to which the harness hooks or snaps may be attached. The shape of the bracket was determined by the necessity for allowing clearance for the line as it passes between the reel spool and the first guide on the rod and by the necessity for increasing the leverage which the angler may apply to the rod. The bracket is preferably constructed of any light strong metal. It has been determined that the farther the bracket is placed above the reel the greater the leverage the angler may apply to the rod.

Referring to the drawing:

Fig. 1 is a perspective view of a rod and reel with the improved harness bracket attached to the forward grip of the rod, showing the harness traces attached to the upper extremities of the bracket. The rod is shown in fishing position with the butt mounted in the fishing chair socket and the harness about an angler;

Fig. 2 is a top elevation of the bracket in position on the rod showing the harness traces attached thereto;

Fig. 3 is a perspective view of a substantially V-shaped embodiment of the bracket;

Fig. 3a is a detail view showing the slot in the extremities of clamp 10;

Fig. 4 is a perspective view of another embodiment of the invention in which a clamp is hinged under the bracket and tightened thereagainst by a suitable wing nut;

Fig. 4a is a detail view showing the slot in the outer extremity of clamp 18;

Fig. 5 is a perspective view of an embodiment of the invention utilizing two hinged arms clamped to the rod by a bolt and wing nut.

Fig. 6 is an end view of an embodiment of the bracket in which the arms make an angle with each other of not less than 90° or more than 120°.

In the drawing, Fig. 1, 1 indicates a fishing rod comprising the usual butt section 2 and tip section 3. Mounted on tip section 3 is forward grip 4 which is usually made of felt. Reel 5 is mounted on butt 2 as by the conventional reel seat mounting. The usual harness-attaching rings 5a are shown affixed at the tops of the side plates of reel 5. A line is illustrated running from reel 5 through the guides on tip 3. Rod 1 is shown mounted in a conventional butt socket 2a affixed to the usual fishing chair 2b. Mounted about grip 4 at a distance of preferably 6" to 12" from reel 5 is bracket 6, which may be constructed of Duralumin, bronze or any light strong metal. Bracket 6 may be formed in any suitable manner, as by stamping, casting, etc. Bracket 6 comprises a base portion 7 and arms 8 carrying suitable attaching rings 9 at their extremities. As illustrated, it is preferably skeletal in form and carries external rib 6a to provide the required strength. Arms 8 are preferably from 4" to 10" in length but may be made longer or shorter if desired. Bracket 6 preferably fits below the rod grip 4 and is affixed thereto by means of suitable curved clamp 10 fitted over the top of rod grip 4 and clamped to bracket 6 by means of bolts 11 and wing nuts 12. Clamp 10 is preferably made of metal and is suitably bored at its extremities, as shown in Fig. 4a, to allow passage of bolts 11, which are suitably mounted on the interior of bracket 6. Base 7 of bracket 6 is preferably curved and recessed to receive the lower portion of grip 4. This curved recess is preferably from 2" to 4" in length, as illustrated, to provide firm seating for bracket 6 against rod grip 4. It is preferably lined with felt to prevent damage to the rod.

A fishing harness is illustrated about the angler's back and shoulders and attached to bracket 6. It comprises back member 13, traces 14 and hooks 15 designed to hook into rings 9 at the extremities of arms 8.

Fig. 2 shows bracket 6 in position on the forward grip 4 of a rod, with arms 8 disposed at substantially 45° angles to a vertical plane through the guides of the rod. Reel 5 is illustrated mounted on butt 2 of the rod and the line is shown passing between the arms of the bracket. Harness traces 14 carrying hooks 15 are shown connected to rings 9 of the bracket. As shown, bracket 6 is preferably mounted from 6" to 12" ahead of the reel, preferably near the forward end of rod grip 4. Curved clamp 10 is shown, fitting over grip 4 of the rod tip and bored to allow passage of bolts 11, mounted on bracket 6. Wing nuts 12 are shown on bolts 11 to tighten clamp 10 over grip 4.

Fig. 3 shows one embodiment of bracket 6. Bracket 6 is preferably constructed of any strong light metal, for example, Duralumin, bronze, etc., and may be cast, stamped or formed in any desired fashion. As illustrated, bracket 6 is preferably substantially V-shaped. Arms 8 preferably form an angle of from 90 to 120° with each other. Base 7 of bracket 6 is suitably recessed to receive the lower portion of the grip of the rod. This recess is preferably from 2" to 4" in length to provide firm seating for bracket 6. Curved clamp 10 is shown suitably positioned over rod grip 4 and adjustable with respect thereto by means of bolts 11 carrying wing nuts 12. This embodiment of the bracket is preferably skeletal in form with reinforcing rib 6a provided about its exterior to give the required strength.

Arms 8 of bracket 6 may be of any desired length, but are preferably from 4" to 10" long. It has been determined that the longer the arms 8 the greater the leverage which may be applied to the rod. As a general rule the heavier the tackle the longer the arms should be. For example, with a 35 oz. tip, 14/0 reel (7" in diameter) and 54 thd. line, arms 8 are preferably from 6" to 10" in length. The length may be regulated to the requirements of the angler.

Illustrated at the upper extremities of arms 8 and suitably affixed thereto are rings 9 designed to receive hooks 15 affixed to harness traces 14.

Fig. 4 illustrates another embodiment of the invention. In this embodiment base 16 of bracket 6 is curved to fit over grip 4 of the rod tip. Hingedly mounted to base 16 as by hinge 17 is curved clamp 18, preferably formed of the same metal as bracket 6. Clamp 18 is suitably slotted at its outer extremity, as shown in Fig. 4a, to receive bolt 19 which is suitably affixed to the under side of base 16. Bolt 19 is suitably screw-threaded to receive wing nut 20. Hinged clamp 18 is suitably curved to fit under grip 4 of the rod tip and is tightened thereunder by means of bolt 19 and wing nut 20. As illustrated, base 16 of bracket 6 is on the order from 2" to 4" in length to provide firm seating for bracket 6 on grip 4. Hinged clamp 18 is illustrated as slightly shorter than base 16. Arms 8, carrying rings 9, are illustrated suitably made integral with base 16. Arms 8 preferably make an angle of from 90 to 120° with each other and are preferably from 4" to 10" in length, though they may be made longer or shorter, if desired. They are preferably rectangular in cross section and taper slightly to their upper extremities. This embodiment is also preferably formed of any light strong metal.

Fig. 5 shows another embodiment of the invention in which arms 21 are provided suitably hinged together at their lower extremities as by hinge 22. Arms 21 are preferably from 8" to 16" in length. They are preferably rectangular in cross section and are formed of any light strong metal. Arms 21 are suitably slotted as at 23 and 24 to allow passage of bolt 25. Slots 23 and 24 are preferably on the order of 2" in length. Bolt 25 is suitably screw-threaded at its extremity to take wing nut 26. Clamping brackets 27 and 28 are illustrated. They are preferably made integral with the lower interior walls of arms 21 from 1 to 2" above hinge 22 and are designed to fit against the sides of the rod grip. Clamping brackets 27 and 28 are preferably from 2" to 4" in length to provide firm seating of the bracket on the grip of the rod. They are clamped against the rod grip by means of bolt 25 and wing nut 26. Harness rings 9 are shown made integral with the tops of arms 21.

Fig. 6 shows an embodiment of the invention, similar to that shown in Figs. 1, 2 and 3, in which arms 8 of the bracket make an angle of not less than 90° or more than 120° with each other.

The device is utilized as follows. After the rod has been assembled and the reel mounted on the reel seat the harness bracket is placed under the forward grip of the rod at a desired distance above the reel, preferably 6" to 12", and is clamped tightly thereto by the clamping means so as to be incapable of longitudinal or lateral movement. With the bracket tightly affixed to the forward grip the line is passed from the reel through the guides and top of the rod and the leader is attached to the line. When the bait is trolling suitably the angler seats himself in the fishing chair, placing the butt of the rod in the swivel socket and then affixes the hooks of his harness traces to the rings at the extremities of the bracket. As the bracket is immovable with respect to the tip of the rod the rod-reel combination will thus be supported in an upright and proper position. The harness traces may be adjusted in length to suit the requirement of the individual angler. For the average angler the harness traces will be from 6" to 12" longer than with the old type of rigging. In fishing position the line running from the reel to the first guide of the rod passes through bracket 6 with more than adequate clearance. Bracket 6 is so attached to the grip of the rod that a vertical plane bisecting the angle between the arms of the bracket will coincide with the vertical plane through the guides of the rod.

Aside from the problem of twisting or disaligning the reel plates caused by affixing the harness traces thereto one of the primary problems facing the angler for large fish is that of raising a heavy fish after he has sounded to a great depth. The tuna, for example, will make several long runs and between runs will sound to great depths, sometimes to three or four hundred yards, depth of water permitting. A six hundred or seven hundred pound fish at this depth is practically immovable. With the old type of harness rigging it was usual practice for the angler to brace himself and for the boatman to move the boat slowly ahead to "start" the fish up. With the present harness bracket, and with the increased leverage it provides, it is possible for the angler to start the fish up by himself by leaning well forward and then putting all of his weight into the harness.

When a heavy fish makes a strong lateral run the strain falls on that arm of the bracket at the opposite side to the run and due to the increased leverage provided by the positioning of the bracket and the substantial length of the arm and harness trace a heavy pressure may be applied on the fish with comparatively slight exertion by the angular.

In "pumping" a heavy fish from the depths the increased leverage provided by the positioning of the bracket and the length of the arms of the bracket enables the angler to put a great deal more force into the "pump" than was previously possible. Moreover, during pumping it is not necessary for the angler to grasp the forward grip of the rod with both hands while pumping and then release his grip with his right hand to turn the reel handle as he leans forward after the pump. With the new bracket it is possible to "pump" with both hands on the reel. This results in a much faster recovery of line than was previously possible.

With this new harness bracket disalignment and excessive wear on the side plates of the reel, due to harness tension thereon, is completely eliminated. The reel is "free" on the rod and there are no harness traces attached to it to interfere with the handling of the reel. Further, due to the improved positioning of the bracket and to the length of the arms thereof the angler is enabled to apply a great deal more pressure on the fish with less exertion than was possible with the old type of attachment. The configuration of the bracket eliminates any possible wear or friction on the line and further enables the angler to place his fulcrum or purchase point at that point on the tip of the rod where he can take full advantage of the flexibility of the tip.

The inventor has experimented with the harness bracket and has found that with it he can exert a great deal more force on an object at the end of the line than was possible with the old type of attachment. Further, he has determined that the new bracket greatly reduces fatigue and enables an angler to bring his fish to the boat in a much shorter time than was previously possible. This aspect of the invention is particularly important in waters where sharks are numerous and where the fish must be boated rapidly or be taken by them.

The method of attaching the bracket to the forward grip of the rod may be varied in many ways. Screw down clamps as illustrated may be utilized, a bolt and wing nut may be utilized, or any other suitable and well known means may be used. The bracket may be made integral with the rod.

The bracket may be substantially V-shaped or U-shaped or any other feasible shape. The arms may be of any desired length, i. e., from approximately 1 inch in length to approximately 10 inches or more in length, depending upon the type of tackle and the type of harness used. The angle between the arms of the bracket, in the substantially V-shaped embodiment, may be varied from approximately 45° to approximately 120° or more. The preferred range of angularity is from approximately 90° to approximately 120°.

The device is particularly designed for use with so-called "heavy" tackle, i. e., rods with tips weighing from 16 to 50 ounces and 24 to 54 thread lines. It may, however, be correspondingly reduced in size for use with lighter tackle. For example, with a 9 ounce tip and 15 thread line, the bracket may be made of Duralumin and the arms may be on the order of 1" to 3" in length.

To sum up, the new bracket reduces damage to reels to a minimum by relieving the plates of all unnecessary strain. It increases the angler's mechanical advantage and leverage on the rod, enabling him to exert great force against the fish with a minimum of exertion. Lastly, it leaves the reel "free" on the rod and enables the angler to handle his tackle with the minimum of exertion and with greater efficiency than is possible with the conventional type of harness attachment. In short, it enables women or men of small stature and strength to take large fish with small danger of strain or over-exertion and in a remarkably short space of time.

The invention is susceptible of numerous embodiments. The specification is for purposes of illustration only and attention is directed to the appended claims for limiting the scope of the invention.

What is claimed is:

1. A harness bracket for fishing rods comprising a base portion curved to fit the grip of the rod, arms affixed to said base portion and extending outwardly and upwardly therefrom, means cooperating with said base portion to hold said harness bracket against movement on a rod, and means provided on said arms to receive the hooks of a rod harness.

2. A harness bracket for fishing rods comprising a substantially V-shaped bracket member designed to fit about the rod, means associated with said bracket member for holding said bracket member against movement on the rod, and means carried by said bracket member to receive the hooks of a rod harness.

3. A harness bracket for fishing rods comprising a substantially V-shaped bracket member designed to fit about the rod, means associated with said bracket member for holding said bracket member against movement on the rod, and means at the upper extremity of said bracket member to receive the hooks of a rod harness.

4. A harness bracket for fishing rods comprising a base section, arms extending from said base section, means associated with said base section for holding said bracket against movement on a fishing rod, and means carried by said arms to receive the hooks of a rod harness.

5. A harness bracket for fishing rods comprising a base section, arms extending from said base section at an angle of not less than 90° and not more than 120° to each other, means associated with said base section to hold said bracket against movement on a rod, and means carried by said arms to receive the hooks of a rod harness.

6. A harness bracket for fishing rods comprising a base section, arms extending from said base section at an angle of more than 45° to each other, means associated with said base section to hold said bracket against movement on a rod, and means carried by said arms to receive the hooks of a rod harness.

7. A harness bracket for fishing rods comprising two arms hingedly affixed together, means associated with said arms for clamping them against movement on a rod, and means carried by said arms to receive the hooks of a rod harness.

8. A harness bracket for fishing rods comprising two arm members articulately affixed together at one extremity for relative movement with each other, means associated with said arm members for clamping them against movement on a rod, and means at the extremities of said arm members to receive the hooks of a rod harness.

JOHN FREEMAN KERKAM.